(12) United States Patent
Chepel et al.

(10) Patent No.: US 8,347,137 B1
(45) Date of Patent: *Jan. 1, 2013

(54) SYSTEM AND METHOD FOR BARE METAL RESTORE OF A COMPUTER OVER A NETWORK

(75) Inventors: Dmitry M. Chepel, Moscow (RU); Serguei M. Beloussov, Singapore (SG); Maxim V. Lyadvinsky, Moscow (RU); Maxim V. Goldobin, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 277 days.

This patent is subject to a terminal disclaimer.

(21) Appl. No.: 12/565,525

(22) Filed: Sep. 23, 2009

Related U.S. Application Data

(63) Continuation-in-part of application No. 11/679,943, filed on Feb. 28, 2007, now Pat. No. 7,721,138, which is a continuation-in-part of application No. 11/346,356, filed on Feb. 3, 2006, now Pat. No. 7,475,282.

(51) Int. Cl.
*G06F 11/00* (2006.01)

(52) U.S. Cl. ..................... 714/6.12

(58) Field of Classification Search .............. 714/6.3, 714/6.12, 6.31, 6.32, 13, 36
See application file for complete search history.

(56) References Cited

U.S. PATENT DOCUMENTS

| | | | | |
|---|---|---|---|---|
| 6,665,815 B1 * | 12/2003 | Goldstein et al. | ................ | 714/20 |
| 6,845,464 B2 * | 1/2005 | Gold | ............................ | 714/6.11 |
| 7,007,195 B2 * | 2/2006 | Alexis | ............................ | 714/6.3 |
| 7,143,275 B2 * | 11/2006 | Cepulis et al. | ..................... | 713/1 |
| 7,216,251 B2 * | 5/2007 | Gaunt et al. | .................. | 714/6.11 |
| 7,281,104 B1 * | 10/2007 | Tsypliaev et al. | ............. | 711/165 |
| 7,313,719 B1 * | 12/2007 | Elahee | ......................... | 714/6.11 |
| 7,334,157 B1 * | 2/2008 | Graf et al. | ......................... | 714/13 |
| 7,353,355 B1 * | 4/2008 | Tormasov et al. | ............. | 711/165 |
| 7,475,282 B2 * | 1/2009 | Tormasov et al. | ............. | 714/6.3 |
| 7,694,165 B2 * | 4/2010 | Sudhakar et al. | .................. | 714/3 |
| 7,721,138 B1 * | 5/2010 | Lyadvinsky et al. | ........... | 714/4.1 |
| 7,779,221 B1 * | 8/2010 | Tsypliaev et al. | ............. | 711/165 |
| 7,805,631 B2 * | 9/2010 | Fries | ............................ | 714/6.12 |
| 7,870,548 B2 * | 1/2011 | Chu Chen et al. | ............. | 717/168 |
| 7,937,612 B1 * | 5/2011 | Lyadvinsky et al. | ............ | 714/10 |
| 7,979,690 B1 * | 7/2011 | Dyatlov et al. | ..................... | 713/2 |
| 2005/0015652 A1 * | 1/2005 | Han et al. | ........................... | 714/6 |
| 2006/0020837 A1 * | 1/2006 | Rothman et al. | ............... | 713/310 |
| 2006/0143501 A1 * | 6/2006 | Tormasov et al. | ................. | 714/5 |
| 2009/0070626 A1 * | 3/2009 | Chen et al. | ......................... | 714/7 |

* cited by examiner

*Primary Examiner* — Scott Baderman
*Assistant Examiner* — Elmira Mehrmanesh
(74) *Attorney, Agent, or Firm* — Bardmesser Law Group (57) ABSTRACT

A system, method and computer program product for providing "bare metal" computer hardware with full operating system capabilities, including: (a) executing software contained in computer hardware read-only memory; (b) transferring software control to a location of a start-up program; (c) performing initialization of devices of the computer hardware; (d) selecting an origin storage device for restoration of an operating system to a destination storage device of the computer hardware; (e) establishing a connection with an origin for restoration of an operating system to the computer hardware; (f) initiating a transfer of the operating system data from selected origin to the computer hardware; (g) performing optional substitution of the computer hardware drivers; (h) performing optional structural modifications to the restored operating system; and (i) restoring the operating system to the computer hardware from a data storage device located either locally or remotely, from full or incremental operating system backup.

27 Claims, 7 Drawing Sheets

SYSTEM AND METHOD FOR BARE METAL RESTORE OF A COMPUTER OVER A NETWORK

This application is a continuation-in-part of application Ser. No. 11/679,943, filed on Feb. 28, 2007, which is a continuation-in-part of application Ser. No. 11/346,356, filed on Feb. 3, 2006.

BACKGROUND OF THE INVENTION

1. Field of the Invention

The present invention is related to restoration of data to a computer system from an existing backup, and more particularly, to providing computer hardware without an operating system, known in the art as "bare metal", with full operating system capabilities.

2. Description of the Related Art

Usually a backup is a copy of data stored on a data storage device, created in order to be used to restore the original state of the data storage device. Such restoration might be required after a loss of data has occurred due to inadvertent data deletion or due to non-recoverable computer hardware failure. In general, the backups are used for two purposes: for restoring a computer system to a previous state, and for restoring selected files from backup.

Frequently, after a critical system failure, the operating system of a computer system cannot be started. In this case, it is necessary to boot up the computer from some other bootable media, such as a bootable CD/DVD disk, to restore the failed file system to its original state, or to install the operating system (OS) and the necessary software on the computer system, or both.

In this case, the CD/DVD disk can contain the software for installing the OS, or for restoring the data storage device to the state that existed prior to the storage device failure. In some cases these procedures can be performed locally. However, in some cases it might be desirable to perform these procedures along with certain modifications to the operating system files, or to perform these procedures remotely.

Accordingly, there is a need in the art for a more flexible system and method for performing "bare metal" restoration of computer data.

SUMMARY OF THE INVENTION

The present invention is intended as a method and system for providing computer hardware without an operating system installed, known in the art as "bare metal", with full operating system capabilities, with a built-in flexibility and enhanced functionality that substantially obviates one or several of the disadvantages of the existing prior art.

In one aspect of the invention there is provided a system, method, and computer program product for restoration of an operating system to computer hardware without an operating system, including: (a) executing software contained in computer hardware read-only memory; (b) transferring software control to a location of a start-up program; (c) performing initialization of devices of the computer hardware; (d) selecting an origin storage device for restoration of an operating system to a destination storage device of the computer hardware; (e) establishing a connection with an origin for restoration of an operating system to the computer hardware; (f) initiating a transfer of the operating system data from selected origin to the computer hardware; (g) performing optional substitution of the computer hardware drivers; (h) performing optional structural modifications to the restored operating system; and (i) restoring the operating system to the computer hardware from a data storage device located either locally or remotely, from either full or incremental operating system backup.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
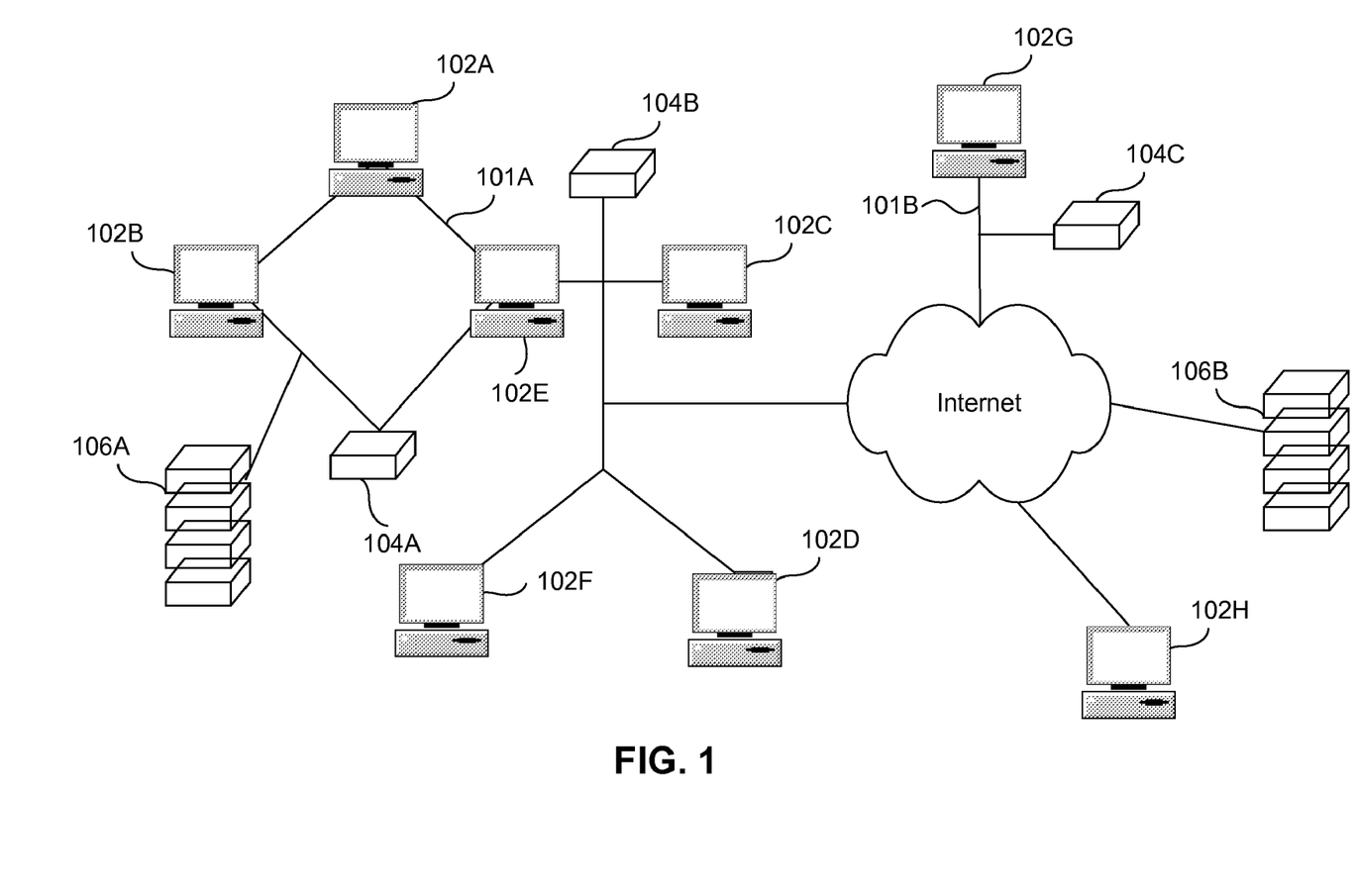
FIG. 1 illustrates an example of a network on which the present invention can be implemented.

FIG. 1 illustrates an example of a network that includes a server that needs to be restarted. For purposes of this discussion, the server that needs to be restarted is server 102A. FIG. 1 also shows a number of servers 102A-102H, connected to each other using such known means as a local area network (LAN) 101A and 101B, a Wide Area Network (WAN), the Internet, or some combination thereof. Also included in the network are storage elements 104A-104C and RAIDs (redundant arrays of independent disks) 106A, 106B. The data on a server 102A can be backed up to a storage device of another server. This server may be a server 102H on the Internet service provider site. Alternatively, the data on a server 102A may be backed up to a storage device, residing on a LAN or WAN, such as 104A or 104C. Although in this discussion the storage device being backed up or the storage device hosting a backup is usually a hard disk drive, or HDD, it will be understood that the invention is not limited to that particular storage medium, but other storage media can be used for creating a backup, such as tape, flash drive, optical drive, etc. It should be noted that the present invention is less applicable for the use with a storage media that has sequential access, or for archiving on devices that use sequential access, such as tapes, although the invention is also applicable to this situation. In case of storage devices that use sequential access, it is preferred to create a backup on some intermediate carrier of information (or some storage device) that has random access capability.

The data being backed up may include a volume partition that relates to the operating system, or it can include the data that the server uses for its operation, without which the server 102A cannot perform useful activities, or both.

Note also that the backup may be either a full backup of data or an incremental backup of some of the files. Unless the amount of data in the incremental backup is substantially less than the amount of data in the full backup, the full backup is preferred, since an incremental backup is usually associated with a higher overhead than a full backup.

For the purposes of the present discussion, regardless of the type of the backup used, it is assumed that such backup exists on some backup storage device, that this backup represents valid data, and that the server 102A, if restored from that backup, will function properly. In some instances it may be necessary to use not the latest backup, but one of the earlier backups, created prior to the latest backup, if it is believed that the latest backup does not represent valid data. However, it is assumed that there is at least one backup available somewhere that can be used for the restoration of server's 102A data, and that backup represents valid data.

It should be noted that not only a copy (or an archived copy) of the disk of the server 102A can be used as a backup, but any other disk or storage medium can be used as well. For example, in the present invention, it is possible to swap the working contents of the disk drives of working servers. Also, it is possible to perform server replication in cases where the capabilities of a particular server are inadequate to perform the tasks assigned to this server due to the server overload.

Figure 2:
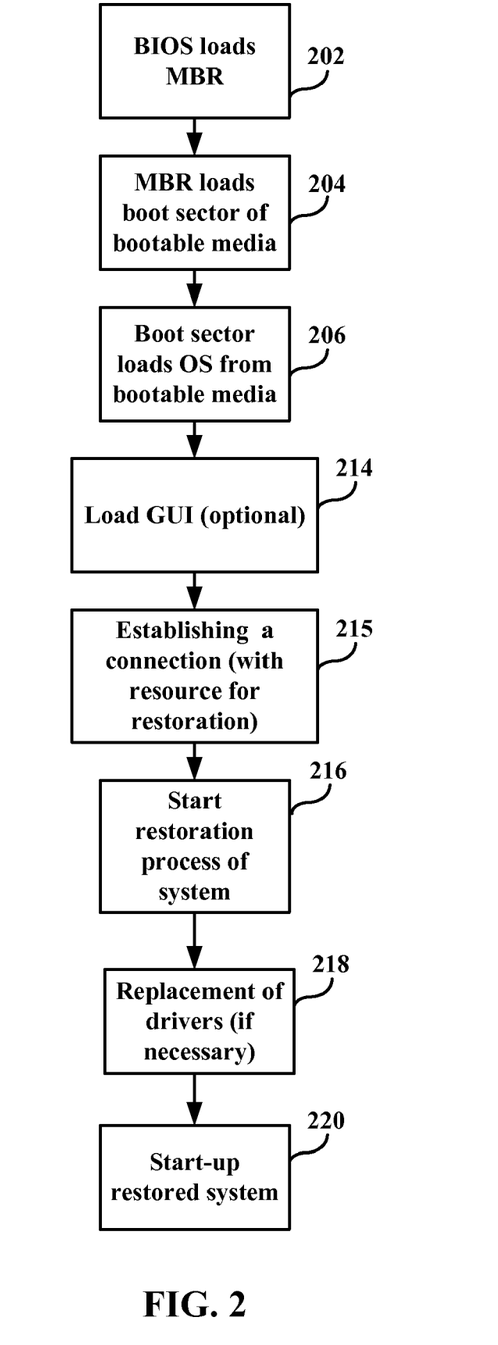
FIG. 2 illustrates one exemplary embodiment of the present invention.

FIG. 2 illustrates one embodiment of the present invention. Modern operating systems are stored on hard disks, flash drives, or other non-volatile storage devices. When computer hardware is powered on for the very first time, it does not have an operating system in memory. The computer's hardware alone cannot perform complex actions such as loading a program from a disk. Therefore, a special small program, called a bootstrap loader, bootstrap or boot loader is required. This program's job is to load other software for the operating system in order to enable the OS to start. Often, multiple-stage boot loaders are used, in which several small programs of increasing complexity are invoked sequentially until the last of them loads the operating system.

In modern computers the bootstrapping process begins with a CPU executing the software contained in read-only memory (ROM), for example, the BIOS of an IBM PC, or EFI of a PowerPC-based Apple Macintosh computer, at a predefined address. The boot process is considered complete when the computer is ready to interact with a user, or the operating system is capable of running ordinary applications. The boot device is the device from which the operating system is loaded. A modern PC BIOS supports booting from various devices. These include the local hard disk drive (or partitions on a hard disk drive), a floppy disk, an optical disk drive, a SCSI device, a Zip drive, an LS-120, a network interface card using PXE and a USB device (USB-FDD, USB-ZIP, USB-CDROM, USB-HDD, USB flash drive).

In step 202, the system is booted up. Upon startup, the computing system's CPU runs the instructions located in the BIOS. It contains a jump instruction that transfers control to the location of the BIOS start-up program. This program initializes devices the computer will rely on during its operation.

Then, in step 204, the BIOS loads and executes the boot sector of the bootable device, such as a CD/DVD disk, flash drive, hard disk drive (HDD), or other. In case of a bootable media, such as HDD, this is referred to as a master boot record (MBR), which code in turn loads HDD sectors for further execution (step 206). In case of a non-partitioned device, this is the volume boot record. In the preferred embodiment, the boot sector itself, or in combination with additional sectors, may contain a recovery operating system, such as Linux. This OS is usually of limited or restricted capabilities. It will typically only contain utilities for network connection (e.g., DHCP), and utilities for working with storage devices.

Note also that prior to creation of the backup, or prior to restoration of the system from backup, it is possible to create a boot disk with an OS having limited capabilities, for example, based on Linux. This disk would include boot areas and data needed to launch the limited capability OS, as well as settings, such as IP address, wifi configuration, network masks, subnet masks, etc. These settings are generally recovered from the registry, or using system APIs, such as "GetComputerName", "GetComputerNameEx", "gethostbyname", etc., and are written to the configuration files of the limited OS, for example, into the Linux network scripts, usually located in "sysconfig/network-scripts/". The boot disk (recovery disk) can also include recovery software, used to restore the backed up OS.

Then, in the optional step 214, an operating system can start a graphical User Interface (GUI). Using this GUI, a user can select a location from which the backup restoration will take place, for example, from a website hosting this backup, from a network resource, from any other computer, connected to the user's computer via a LAN, WAN or through the Internet.

Next, in step 215, a connection with storage device hosting the backup data is established.

It should be noted that the BIOS of most computer systems provide a possibility of assigning priority to bootable devices. In this case, it may be useful to set the correct order of booting and rebooting devices of the computer system in the BIOS settings.

Note that this description is applicable to the Intel X86, AMD64, IA-64 and EFI architectures. Other processor architectures and operating systems have slightly different approaches, although the general principles are essentially the same and are intended to be covered by this description.

In step 216, the backup restoration procedure begins and the transfer of data is taking place from a selected source to a selected destination of the disk, storage device or volume being restored.

Backup may include several parts. For example, the backup may be performed at the file level, and in this case will include all the files residing on a given storage location or medium, such as a hard disk. It should be understood that although the term "hard drive" or "hard disk drive" (HDD) is commonly used, the actual storage medium at issue does not need to be an entire disk drive (or even a disk drive as such). It can be a logical drive, a flash disk, a partition of a disk drive assigned to a particular server, or a partition assigned to a particular virtual private server. It can also be a network drive or a portion of a network drive, or it can be a distributed storage system that acts as a single logical drive. However, from the perspective of an operating system, a device exists and acts analogously to a hard disk drive that can be accessed using device drivers. Furthermore a server is only an example of the computing system where the invention may be used. Other hardware systems, such as desktops or mobile computers can use the invention. In addition, the backup may include the MBR and the loading code of the volume on the block level, which in turn may include the system information and other necessary information for the correct operation of the system that is being restored on the block level, where "blocks" can mean data blocks themselves, such as disk sectors, or clusters or similar aggregates of blocks.

Therefore, in step 216 the information can be transferred from the backup to the disk both on the block and the file levels.

The backup selected for restoration may contain the information that was backed up only on the block level, or the information that was backed up only on the file level. A good example of the latter case is a backup of the NTFS file structure, where all the information residing on the disk is represented as files. It should be noted that the backup may also contain the information in a mixed format, if one part of the data was backed up on the file level and another part of the data was backed up on the block level.

Next, in step 218, after the restoration process of all data has been completed to a specified destination, it might be necessary, in order to ensure the correct operation of the system, to replace some of the system drivers, such as the hard disk controller drivers or the video card drivers. This replacement of the drivers may be performed by copying of the required files from the data that has already been transferred to the storage medium, from additional storage carrier, provided with a particular data storage device, from the local area network, or from the Internet.

In addition to copying of the necessary files, certain modifications may be required to the restored operating system. For example, in case of the MS Windows operating system, these modifications might include changes to at least one driver for at least one device installed on the computer system (such as a HDD, soundcard, etc.), or modification might be necessary to the OS registry. One part of the registry data is saved in files (for example, for Windows 95/98 such files are User.dat and System.dat, for Windows ME—Classes.dat, User.dat and System.dat, for Windows Vista—BCD (Boot Configuration Data), but the other part of the registry data is created during Windows operating system start-up. After certain applications have been installed under Windows OS and the system has been used, such files as "system", "software", "sam", "security", etc., "default" are stored in the "% SystemRoot %\System32\Config\" folder.

In addition to these files, some files which are used during creation of a "working version" of the registry can be saved in the "% SystemDrive %\Documents and Settings\<Username>\" folder to be used with"Ntuser.dat" file, of in the "% SystemDrive %\Documents and Settings\<Username>\Local Settings\Application Data\Microsoft\Windows\" folder to be used with "UsrClass.dat" file.

Also such files can include "userdiff", "userdiff.LOG", "TempKey.LOG", and other files of the registry.

To ensure proper operation of the OS commands and functions, (such as "RegOpenKeyEx", "RegDeleteValue", "RegSetValueEx", "RegSaveKeyEx", "RegLoadKey", "RegReplaceKey", "RegRestoreKey" and others), the data in these files can be changed, replaced or loaded. For example, the parameters of the previously used HDD can be replaced with the parameters of a newly installed HDD.

The data in the registry files can be changed directly, i.e. a new string (or a part of a string) can be added instead of the old string in the registry file, if a registry file has a structure, for example, of a text file (*.txt).

Figure 3:
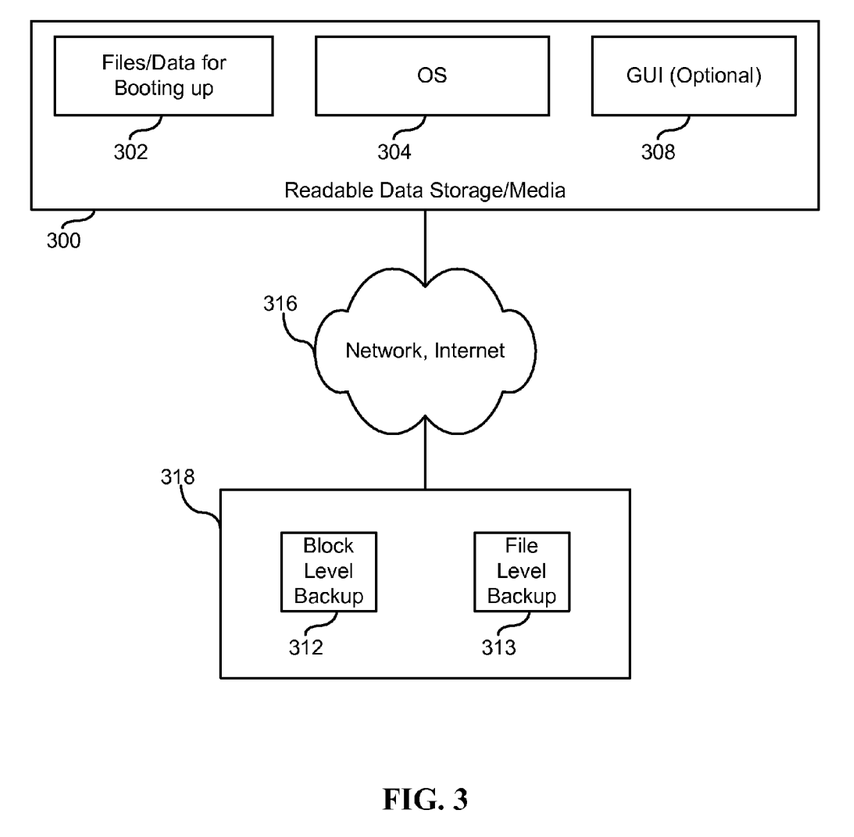
FIG. 3 illustrates exemplary computer readable and writable data storage devices that may be used with the present invention.

If a new device has been installed on a computer system, or an old device has been replaced with a new device, it might be necessary to install at least one device driver and/or other files necessary for proper operation of such new device. In this case, a user can use GUI 308 or the OS GUI to select a location from which the needed device drivers or other necessary files can be installed to ensure proper operation of the newly installed device and of the computer system.

Logical sections of BCD, commonly known as "hives" (for Windows Vista and later versions of Microsoft OS) and a system file boot.ini (for Windows XP and earlier versions of Microsoft OS) contain references to storage device partitions. These references include device identifiers. For example, in case of the MBR disks these identifiers are NT signatures of disks and partitions and the offsets of the partitions from the base address of the disk. The values of these identifiers might have to be modified if a new device is installed as an additional device or as a replacement for the old device. As another example, a letter designating a partition might have to be changed in "HKLM/system/" and in "HKLM/consolesetXXX/enum/storage/volume" when the HDD is replaced or the operating system is restored to a different part of the HDD.

For dynamic disk volumes, additional drivers "dmload." and "dmio.", which are part of the Windows OS, must be connected. In order to enable loading from a dynamic volume, they must be marked as "boot" and"system". The MBR disks, in addition, must be marked as "active", with an exception of EFI OS), and must be contiguous. For the MBR disks, the volume also must be marked as "primary" and "active".

Finally, in step 220, the restored computer system can be started up.

FIG. 3 illustrates some exemplary computer data storage devices on which the invention can be implemented.

Figure 5:
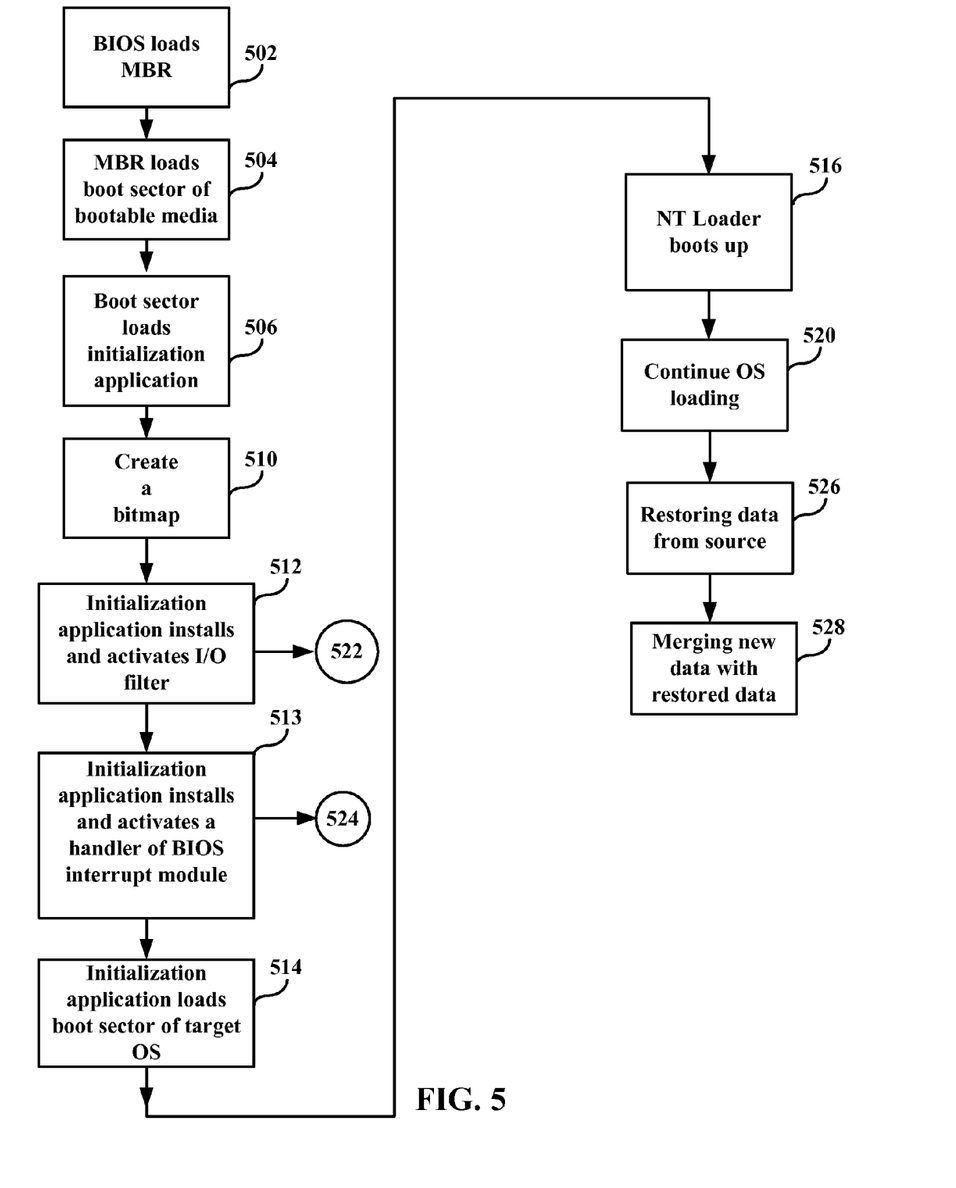
FIG. 5 illustrates another exemplary embodiment of the present invention.
Figure 6:
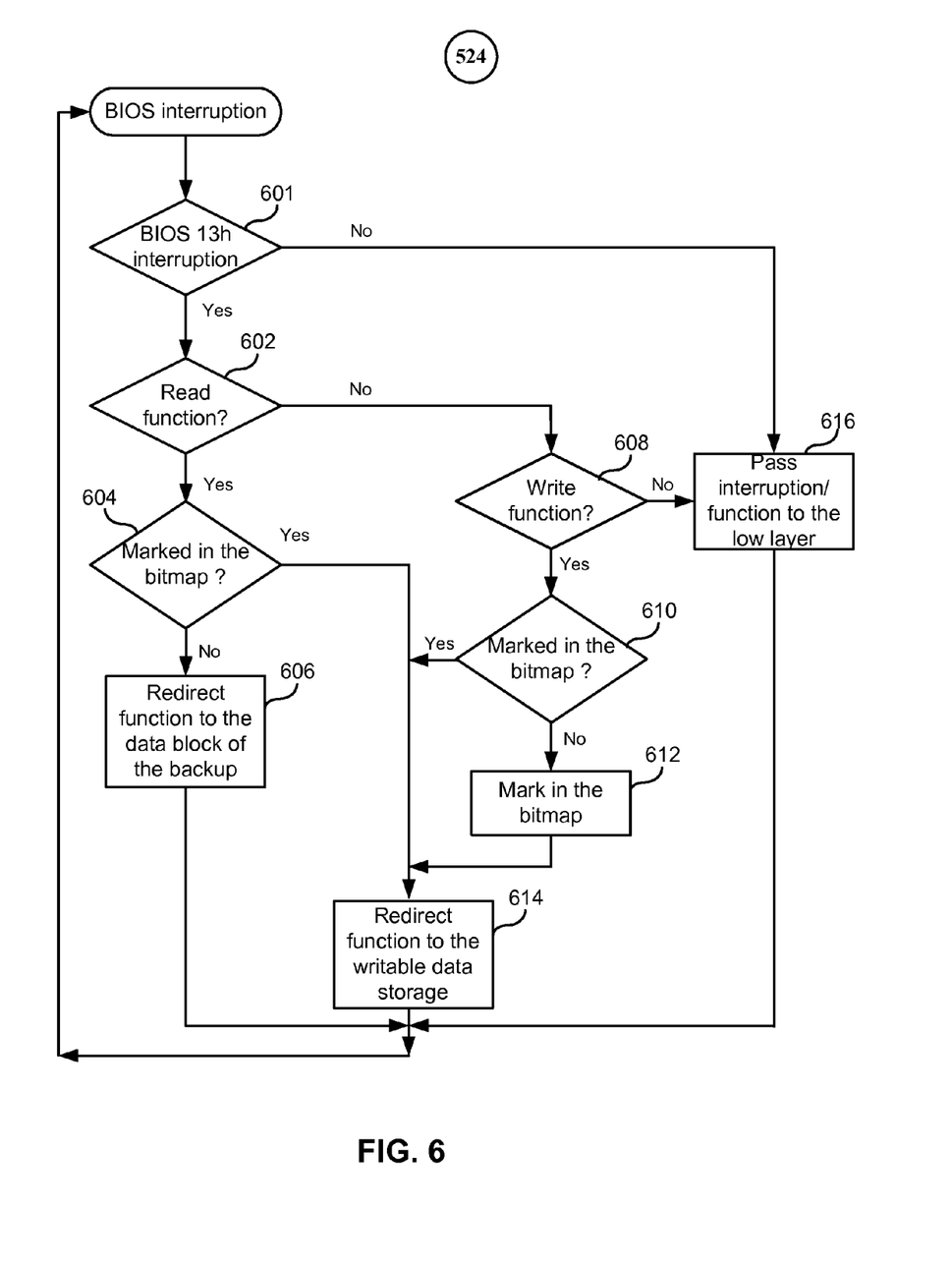
FIG. 6 illustrates the process of handling BIOS interrupts in the present invention.
Figure 7:
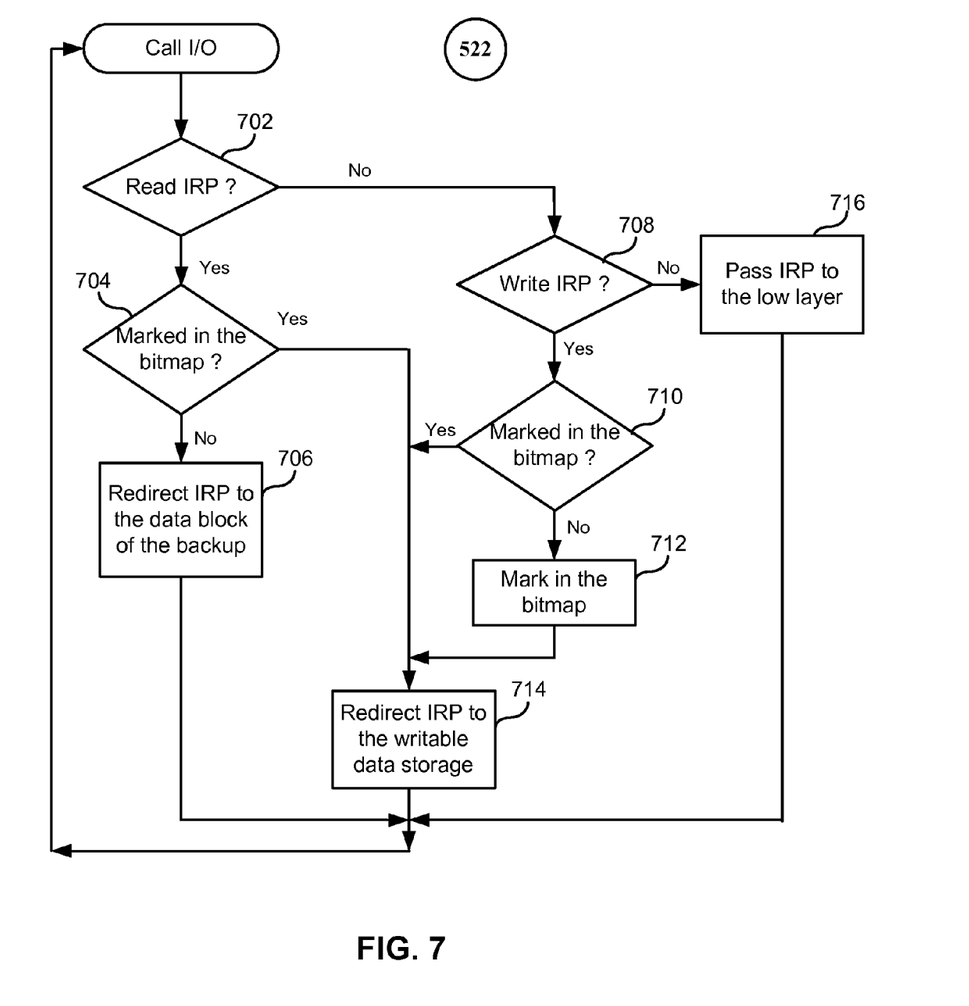
FIG. 7 illustrates the process of handling IRPs in the present invention.

Referring to FIG. 3, the data storage medium 300 can store files or data 302 for booting up a computer system. In case of a bootable media, such as a HDD, this data can be the master boot record (MBR), containing the code that loads additional HDD sectors for further execution and loading an operating system, such as Linux, DOS or any other OS. In case of a non-partitioned device, this is the volume boot record. For the OS 304, the data stored on the data storage 300 can be used for pointing to the location of a backup from which the OS can be restored. With reference to FIGS. 5-7, the OS 304 can also start the handler of BIOS interrupt module 601, which is illustrated in FIG. 6. The BIOS interrupt module 601 is used for handling interrupt requests from the boot loader.

The OS 304 can also perform the following operations: decompress the data blocks stored in the Block Level Backup 312 and in the File Level Backup 313 on the network node or on a designated Internet site 316.

With reference to FIGS. 5-7, the OS can also create a bitmap (which is described in FIG. 5) of the data blocks stored on the data storage media 318, load initialization application (in step 506) with installing and starting the I/O filter (in step 512) and initiate the BIOS loads from the boot sector of the target OS from the image, as described in FIGS. 5-7. Image, in this context, refers to a block-level copy of some stored data or device, such as a partition, a volume, a portion of a partition, a disk, a dynamic disk, a logical disk drive, etc.

The data storage/media 300 may store the code for a graphical user interface (GUI) 308. The GUI can include the tools for searching or selecting the data storage device that stores a backup/image to restore from. The GUI may also be used for establishing a connection with a resource containing the backup, such as a particular Internet site, a network storage device or another resource. The procedures for searching or selecting this data storage device, or for connecting to this device may be coded in scripts or specified in a file.

After booting up from the readable data storage/media 300, the computer system can start restoration process 216 (see FIG. 2) from the data storage 318, or from another source, such as an Internet site. These data storage devices may include, without limitation, a HDD, a flash memory card, a writable/rewritable compact disk, a digital versatile disk, a network disk and other devices.

The access to the data storage/media 318 can be executed using a storage area network, the Internet, a local area network or any other mechanism available for accessing remote storage in cases when the media hosting the appropriate backup is located on another machine. The data storage 300 can also be a writable media, so that a new data can be written to the data storage 300. In this case the data storage unit 318 is not necessary for the operation of the computer system. The backup itself can be a backup that is open for editing, so that a new data can be written to it, overwriting part of the existing data or in addition to existing data. It should be noted that the data storage device 318 can be a part of the data storage 300, for example, as another volume of the same hard disk drive.

Without limiting the scope of this invention, the data storage 318 may be connected to the data storage 300 through a network, IDE, SATA interfaces, USB interface.

In case an incremental or a differential backup is selected as a source for restoration, the restoration process will be similar to the restoration process described above, with some modifications specific to working with incremental or differential backups.

An incremental backup is a type of a backup where only the files that have changed since the last backup undergo the backup process. In case of an incremental backup, the only data being backed up is the data that has changed since the last backup was performed. If an incremental backup has been selected for restoration, and if the requested data is not contained in this backup, it may be found in one of the previous incremental backups or in the initial full backup, using the links to these backups. As an example, these links may be stored in the internal backup bitmap.

A differential backup is a backup that contains all the files that have changed since the last full backup. The advantage of a differential backup is that it shortens restore time compared to a full backup or an incremental backup. However, if the differential backup is performed too many times, the size of the differential backup might grow to be larger than the baseline full backup. Whereas an incremental backup includes all the files modified since the last full backup, differential or incremental backup, differential backup offers a middle ground by backing up all the files that have changed since the last full backup. If a differential backup has been selected for restoration, and if the requested data is not contained in this backup, it may be found in the initial full backup using the link to this full backup. This link may be stored in the internal backup bitmap.

Note that the GUI 308, the OS 304, the backups 312 and 313, and the incremental backups may be stored on the same or different storage devices. It should also be noted that the process of computer system restoration can be performed from a network storage device rather than from a local storage device. This method of restoration can be used by routers, diskless workstations and the centrally managed computers. For example, the Preboot eXecution Environment (PXE) can be used, and the files/data 302 used for restoration can be stored on the network data storage device. PXE is an environment for booting computers through using a network interface independently of accessible or available data storage devices (such as hard disks drives) or installed operating systems.

The PXE protocol is the one that might be used in combination with Dynamic Host Configuration Protocol (DHCP) and Trivial File Transfer Protocol (TFTP), even though with some modifications. DHCP is used to locate the appropriate (or specified) boot server or servers, with TFTP used to download the initial bootstrap program and additional files.

Figure 4:
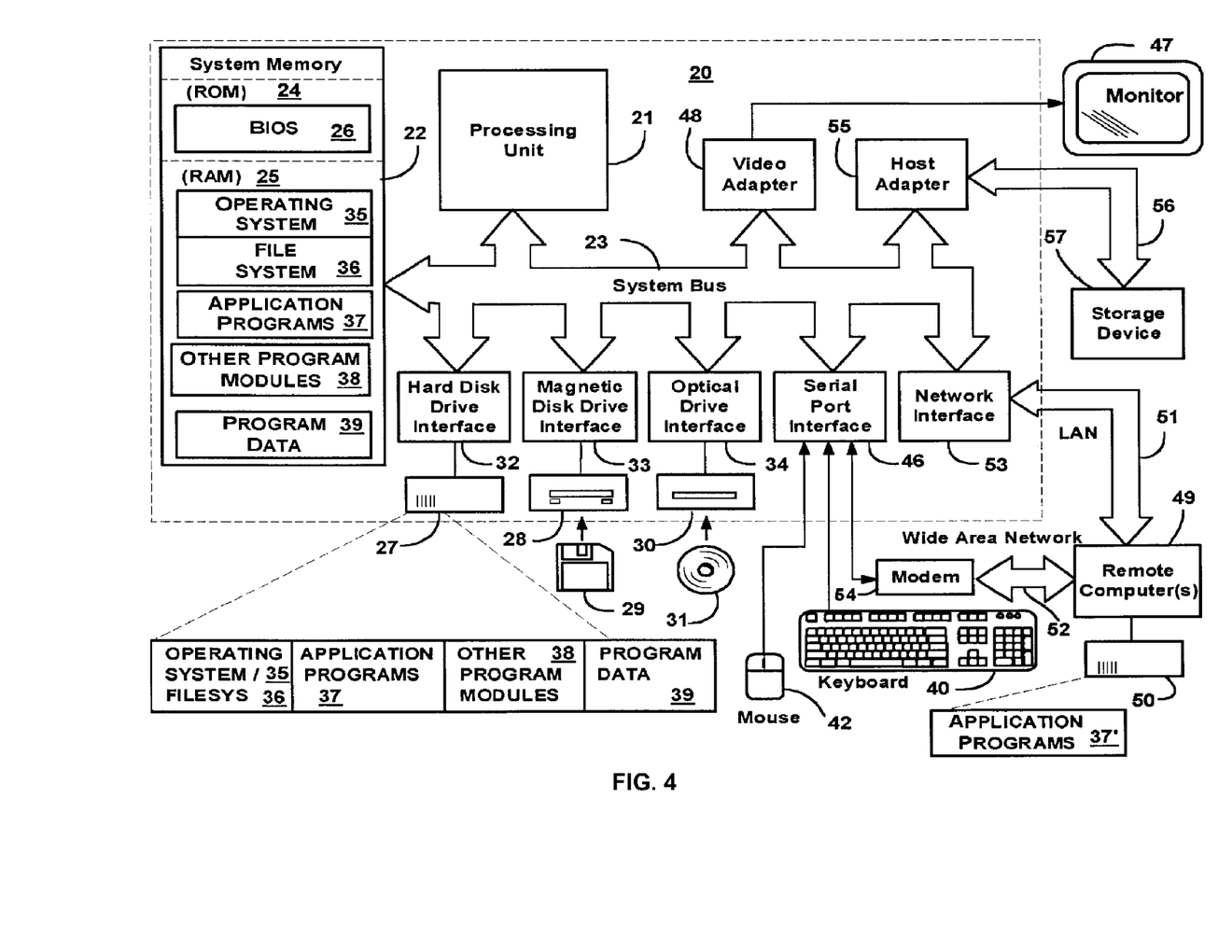
FIG. 4 illustrates an example of a computer architecture that may be used in the present invention.

With reference to FIG. 4, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ XP or Windows™ Vista). The computer 20 includes a file system 36 associated with or included within the operating system 35, such as the Windows NT™ File System (NTFS), one or more application programs 37, other program modules 38 and program data 39.

A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20. It may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIG. 5 illustrates another embodiment of the present invention, which can be used in combination with the embodiment described above with reference to FIGS. 1-3.

As previously stated, the modern operating systems are stored on hard disks, flash drives, or other non-volatile storage devices. When computer hardware is powered on for the very first time, it does not have an operating system in memory. The computer's hardware alone cannot perform complex actions such as loading a program from a disk. Therefore, a special small program, called a bootstrap loader, bootstrap or boot loader is required. This program's job is to load the other software for the operating system in order to enable the OS to start. Often, multiple-stage boot loaders are used, in which several small programs of increasing complexity are invoked sequentially until the last of them loads the operating system.

In modern computers the bootstrapping process begins with a CPU executing the software contained in read-only memory (ROM), for example, the BIOS of an IBM PC at a predefined address. The boot process is considered complete when the computer is ready to interact with a user, or the operating system is capable of running ordinary applications. The boot device is the device from which the operating system is loaded. A modern PC BIOS supports booting from various devices. These include the local hard disk drive (or partitions on a hard disk drive), a floppy disk, an optical disk drive, a SCSI device, a Zip drive, an LS-120, a network interface card using PXE and a USB device (e.g., USB-FDD, USB-ZIP, USB-CDROM, USB-HDD, USB flash drive).

In step 502, a computer system selected for restoration is booted up. Upon startup, the computing system's CPU runs the instructions stored in the internal system's memory, such as BIOS. The BIOS contains a jump instruction that transfers control to the location of the BIOS start-up program. This program initializes devices that the computer system will rely on during its operation.

Note, that these operations are described using an example of a Linux OS loader. However, these operations are also applicable to loaders working under other operating systems, such as DOS.

Then (step 504), the BIOS loads and executes the boot sector of a bootable device, such as CD/DVD disk, flash drive, hard disk drive (HDD), or other. In the case of a bootable media, such as HDD, this is referred to as the master boot record (MBR). The MBR code in turn loads HDD sectors for further execution (step 506). In case of a non-partitioned device, this is the volume boot record. In the preferred embodiment, the boot sectors themselves, or in combination with additional sectors, may contain an initialization application or procedure. This initialization application or procedure can run in a single thread mode, since it has minimal functionality and, in some cases, does not require any operating system kernel for execution. In effect, the initialization application can be viewed as a substituted loader procedure (driver) that may be somewhat analogous to DOS programs that do not require an operating system kernel, or even an operating system, to run.

Such initialization application can be an application that identifies media containing the backup of the data storage device together with the boot blocks, for example, the data storage backup with installed OS and applications.

In step 510, a bitmap of the data blocks stored in the backup and on the writable data storage (to where data will be written) is created. Using the bitmap, upon a disk access request, it is determined whether the particular data block that is being accessed in the backup has already been changed (written/rewritten), or updated during the operation of the computing system, or whether the corresponding sector is still located in the backup. The access to the backup can be executed using a storage area network, a local area network or any other mechanism available for accessing remote storage, if the writable media or the backup is located on another machine.

In step 512, the initialization application installs in memory and activates an I/O filter, which accesses the I/O devices, physical devices (such as disk drives), disk partitions, logical drives, logical partitions, or their combinations. Applications address the writable data storage device and the backup the same way they would address virtual data storage, as a single address space, although the processing of the requests may require readdressing of the requests either to the disk being restored or to the disk backup, based on the procedures discussed below.

The functioning of the I/O filter (522) is further illustrated in FIG. 7.

Then, in step 513, the initialization application installs in memory and activates a handler of the BIOS interrupt module, which interrupts the boot loader requests, such as BIOS or EFI requests, to the media from which it is booting up, and redirects them to the data blocks stored in the backup. The processing (step 524) of boot loader requests by a handler of BIOS interrupt module is illustrated in FIG. 6.

In step 514, the initialization application initiates the BIOS loads and executes the boot sector from the backup. After that, the initialization application transfers control to a routine defined by the MBR (for example, in cases where the backup consists of a snapshot of the hard disk drive). At this stage of the process a handler of BIOS interrupts should be loaded. As a result, the operating system then boots from the backup. Next, in step 516, the OS loader (e.g., NT loader) loads at least one of boot drivers (for example, such as those used with Windows NT or Windows XP operating systems).

It should be noted that the BIOS of most computer systems provide a possibility of assigning priority to bootable devices. In this case, it may be useful to set the correct order of booting and rebooting devices of the computer system in the BIOS settings.

Note that this description is applicable to the Intel X86, AMD64, IA-64 and EFI architectures. Other processor architectures and operating systems have slightly different approaches, although the general principles are essentially the same and are intended to be covered by this description.

If the data blocks stored in the backup are compressed, then the compressed data needs to be decompressed, and then the boot loader can read the necessary data from the media.

The backup, either compressed or non-compressed block level backup of the data storage device, is visible to the boot loader as "normal" bootable data storage.

In one embodiment, because the I/O filter, once started, handles the data storage device access requests, the system will be able to use the virtual data storage and continue the booting procedure as it is done in a standard routine (step 520). From the hardware perspective, the virtual data storage (or virtual HDD) will be treated as if it were an integral local hard drive.

After the OS has been loaded in step 520, or even while it is being loaded, the described above OS restoration process can be started in step 526 as a background process.

In step 528, after the data restored from the source to the target data storage device, the process of data merging can be started. During this process the new data from the writable data storage and the data on the targeted data storage can be merged together. The bitmap created in step 510 can be used for this process.

Furthermore, through the described mechanism, during or after the system boot-up process, a virtual storage device can be created and all the updates could be directed to that virtual storage device, since the I/O filter used for interfacing to the data storage could be updated accordingly.

In addition to the I/O filter, the disk level filter can be added as well. The disk level filter may be implemented as a separate module. This module, essentially a kernel mode driver, can be installed in addition to the standard disk driver and can filter or intercept all the I/O requests passed to the low-level disk driver. For example, the disk level filter may be layered in-between the low-level disk driver and the file system that resides above it. In some circumstances this approach may be preferred for performance reasons and is functionally equivalent to the disk driver substitution. Similarly, removing of the disk level filter is functionally equivalent to restoration of the original disk driver.

The virtual HDD essentially corresponds to the original HDD of the machine or, as an option, only to a certain partitions of the original HDD. This procedure ensures that the disk drive I/O is addressed correctly to the virtual HDD rather than to the local HDD or some other "incorrect" storage device. Additional details may be found in U.S. patent application Ser. No. 12/115,834; Filed: May 6, 2008, entitled SYSTEM AND METHOD FOR BOOTING A COMPUTER FROM BACKUP, incorporated herein by reference in its entirety.

FIG. 6 illustrates the process of handling BIOS interrupts. As shown in FIG. 6, the process remains in a waiting mode when no BIOS 13 h interrupt are generated by the BIOS. After receiving a BIOS 13 h interrupt to the virtual data storage in step 601, in step 602 the process checks if the function of BIOS 13 h interrupt is a read function (for example, 02 h, OAh or OEh BIOS interrupt functions). If it is a read function, then, in step 604, the process checks if the particular storage unit is marked in the bitmap. The bitmap indicates which blocks or clusters of the virtual data storage were modified, and the corresponding modified data is stored in the writable data storage. If the storage unit is not marked in the bitmap, then the read function is redirected to the data block of the backup in step 606. The process then returns in a waiting mode when no BIOS 13 h interrupt are generated by the BIOS. If, in step 604, the storage unit is recognized as marked in the bitmap, then the access function is redirected to the writable data storage in step 614. The process then returns in a waiting mode when no BIOS 13 h interrupt are generated by the BIOS.

If in step 602 the function of BIOS interrupt is not a read function, then in step 608 the process checks if the function is a write function (such as 03 h, OBh and OFh BIOS interrupt functions). If it is not a write function, then, in step 616, the function is passed to the lower layer, and the process returns in a waiting mode when no BIOS 13 h interrupt are generated by the BIOS. Note that the backup and the writable data storage can all reside on the same physical drive and occupy either the entire drive or exist as files, folders or partitions. Using the described procedure, other functions may be passed to any pre-assigned physical storage or backup.

Note that the other functions of BIOS interrupt can also work with a data storage device, such as receiving of the disk parameters (08 h), receiving the type and size of the disk (15 h), positioning the head of the disk (OCh), etc. These functions can access the data storage device without calling the read/write functions of the BIOS interrupts described above. These functions can be also intercepted and redirected to the corresponding data block of the backup.

If in step 608 it is determined that the function is a write function, then in step 610 the process checks if the storage unit is marked in the bitmap. If it is market in the bitmap, then the process proceeds to step 614 as described above. If it is not marked, then the storage unit is marked in the bitmap (step 612), the process proceeds to step 614 and the data is written to the corresponding block of the writable data storage.

In other words, all attempts to write to the backup are redirected to the writable data storage. The system itself does not "know" that the storage it is accessing is a writable data storage device rather than a backup.

Note that if the backup designated as open for editing (i.e., new data blocks can be added to the backup, or old data blocks in the backup can be replaced by the new data blocks), then all the attempts to write to the backup are redirected to the backup. In this case, such backup must be located on the writable media data storage device.

FIG. 7 illustrates the IRP handling process (see step 522 in FIG. 5). As shown in FIG. 7, the process stays in a waiting mode when no IRPs are generated by system utilities or by a user application. After receiving an IRP directed to the virtual storage, in step 702, the process first checks if the IRP is a READ IRP. If it is a READ IRP, then in step 704 the process checks if the particular storage unit is marked in the bitmap (which indicates which blocks (e.g., a cluster) of the virtual data storage was modified. The corresponding modified data is then stored in the writable data storage. If the block was not modified, the IRP is redirected to the backup in step 706. The process then returns in a waiting mode when no IRPs are generated by the system utilities or by a user application. If, in step 704, the storage unit is recognized as marked in the bitmap, then the access request is redirected to the writable data storage in step 714. The process then returns in a waiting mode when no IRPs are generated by the system utilities or by a user application.

If, in step 702, the IRP is not a READ IRP, then the process checks if the IRP is a WRITE IRP (step 708). If it is not a WRITE IRP, then, in step 716, the IRP is passed to the lower layer, and the process returns in a waiting mode when no IRPs are generated by the system utilities or by a user application. Note that the backup and the writable data storage can all reside on the same physical drive and occupy either the entire drive or exist as files, folders or partitions. Using the described procedure, other IRPs may be passed to any pre-assigned physical storage or backup.

If in step 708 it is determined that the IRP is a WRITE IRP, then the process checks if the storage unit is marked in the bitmap (step 710). If it is, then the process proceeds to step 714, as described above. If it is not, then the storage unit is marked in the bitmap (step 712), the process proceeds to step 714, and the data is written to the corresponding block of the writable data storage.

In other words, all attempts to write to the backup are redirected to the writable data storage. The system itself does not "know" that the storage it is accessing is a writable data storage device rather than a backup.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A method for providing full operating system capabilities to computer hardware without an operating system, the method comprising:
   (a) launching a first (recovery) operating system having limited capabilities;
   (b) transferring control to recovery software located within the recovery operating system;
   (c) initializing hardware devices of the computer hardware;
   (d) selecting a source storage for restoration of partitions or hard disk drives including a second operating system, the second operating system being restored to a destination storage device of the computer hardware;
   (e) establishing a connection over a network to the source storage;
   (f) selecting backups within the source storage for restoration, the backups including a file-level backup, image of file system metadata and boot code for initial operating system load;
   (g) transferring image data based on a bitmap of data blocks stored in the image portion of the backups;
   (h) initiating a transfer of the second operating system data from the selected source storage to the destination storage device;
   (i) restoring the second operating system to the computer hardware;
   (j) modifying the second operating system to enable the second operating system to configure its environment and hardware devices; and
   (k) substituting drivers of the computer hardware.

2. The method of claim 1, wherein the selection of the source storage invokes a graphical user interface.

3. The method of claim 1, wherein the source storage is a remote storage device accessible over a network.

4. The method of claim 1, wherein the source storage is a virtual storage device.

5. The method of claim 1, wherein the restoration of the second operating system is performed from an incremental backup with subsequent merging of full backup data and incremental backup data.

6. The method of claim 5, wherein the full backup and the incremental backup are block-level backups.

7. The method of claim 5, wherein the incremental backup is a file-level backup.

8. A method for booting a computer system from backup, the method comprising:
   launching a first (recovery) operating system with limited capabilities;
   transferring control to recovery software that acts as an initialization application and which is located within the recovery operating system;
   initializing hardware devices of the computer system;
   installing and activating a handler of a Basic Input/Output System (BIOS) interrupt module, for intercepting boot loader requests to a storage media, and for redirecting them to the backup;
   loading a bitmap of data blocks stored in the backup(s) and creating a bitmap of a writable data storage device to which new data will be written;
   initiating the BIOS to load and execute boot blocks from the backup(s);
   transferring control to a routine defined by a boot record stored in the backup's boot blocks;
   installing and activating an I/O filter for intercepting the requests to the writable data storage device, and
   after a write request is received, the I/O filter writes a corresponding data block to the writable data storage, and marks this data block in the bitmap to indicate that this block is stored on the writable storage device;
   after a read request is received, the I/O filter checks the bitmap to see if this data block was not changed, and redirects the read request to the backup to read the data block, and
   if the requested data block was changed and written to the writeable data storage device, then the I/O filter redirects the read request to the written blocks on the writeable data storage device.

9. The method of claim 8, wherein at least one incremental backup is created from the data blocks written to the writeable data storage device.

10. The method of claim 8, wherein the backup is editable, such that data blocks in the backup are replaceable by substitute data blocks, and new data blocks can be added.

11. The method of claim 8, wherein the writable data storage device and the backup form a single address space and are represented by a virtual data storage.

12. The method of claim 8, further comprising using a graphical user interface to select a backup, out of multiple backups, for booting up.

13. The method of claim 8, wherein the backup(s) are accessible over a network.

14. The method of claim 8, wherein the backup(s) are located on a virtual storage device.

15. The method of claim 8, wherein the backups include a file-level backup, image of file system metadata and boot code for initial second operating system load.

16. The method of claim 8, wherein computer system service data stored in the backup(s) is updated during the booting.

17. The method of claim 8, wherein the backup is stored on a remote storage device, and the boot up is performed over a network.

18. The method of claim 8, further comprising booting multiple computer systems from the same backup.

19. A non-transitory computer useable storage medium having computer executable program logic stored thereon, the computer executable program logic executing on a processor for implementing the steps of claim 8.

20. A system for providing full operating capabilities to computer hardware without an operating system, the system performing the functions of:
    (a) executing software contained in computer hardware's read-only memory;
    (b) transferring control to a location of a start-up program;
    (c) performing initialization of devices of the computer hardware;
    (d) selecting an origin storage device for restoration of an operating system to a destination storage device of the computer hardware;
    (e) establishing a connection with an origin for restoration of an operating system to the computer hardware;
    (f) substituting drivers of the computer hardware;
    (g) modifying the operating system that will be restored;
    (h) restoring the operating system to the computer hardware;
    (i) creating a bitmap of data blocks stored in a backup and in the destination storage device;
    (j) after a write request is received, writing a corresponding data block to the destination storage device, and marking this data block in the bitmap; and
    (k) initiating a transfer of the operating system data from selected origin to the computer hardware.

21. The system of claim 20, wherein the selection of the origin for restoration of the operating system comprises optional invocation of a graphical user interface which allows to perform said selection.

22. The system of claim 20, wherein the origin for restoration of the operating system is a remote storage device accessible over a network.

23. The system of claim 20, wherein the origin for restoration of the operating system is a virtual storage device.

24. The system of claim 20, wherein the restoration of the operating system is based on creation and evaluation of a bitmap of the origin storage device and the destination storage device.

25. The system of claim 24, wherein the restoration of the operating system includes installation and activation of an I/O filter to control device access requests.

26. The system of claim 25, wherein the restoration of the operating system includes installation and activation of a disk level filter.

27. The system of claim 26, wherein the restoration of the operating system is performed from an incremental backup with subsequent merging of restored data and new data.

\* \* \* \* \*